Dec. 20, 1960 W. H. PERCIVAL 2,965,083
ACCUMULATOR SUPERCHARGING
Filed Dec. 11, 1958
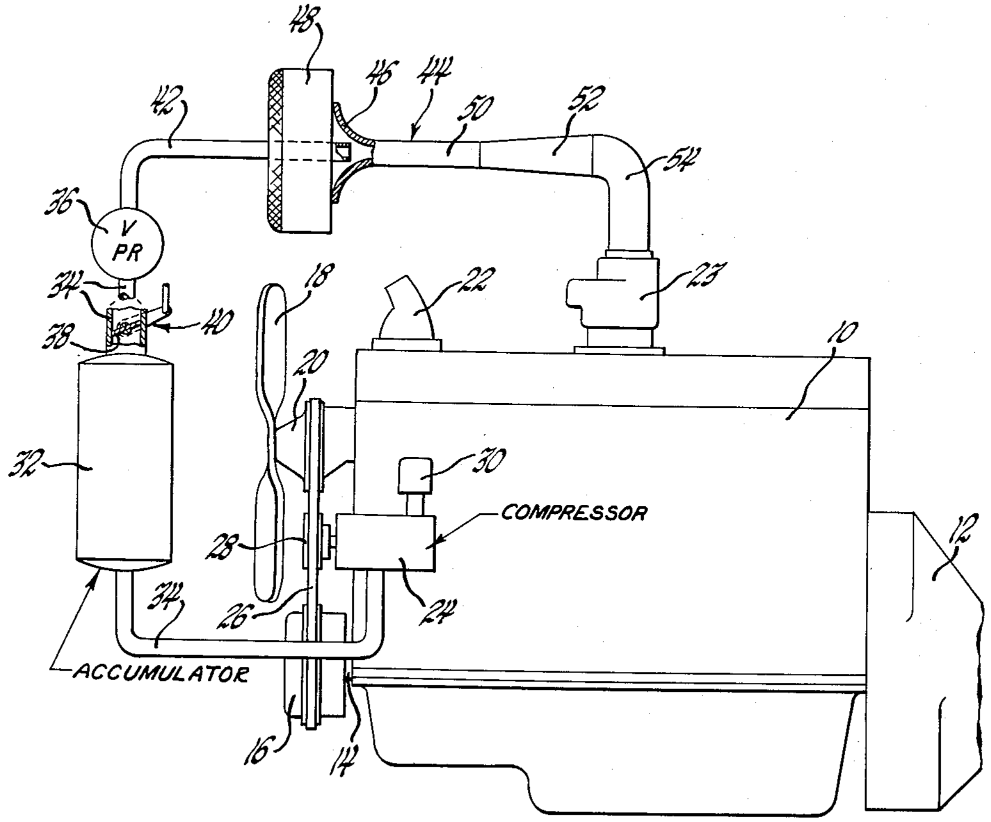
INVENTOR.
Worth H. Percival
BY L. D. Burch
ATTORNEY United States Patent Office 2,965,083

Patented Dec. 20, 1960

1

2,965,083

ACCUMULATOR SUPERCHARGING

Worth H. Percival, St. Clair Shores, Mich., assignor to General Motors Corporation, Detroit, Mich., a corporation of Delaware Filed Dec. 11, 1958, Ser. No. 779,715

4 Claims. (Cl. 123—119)

This invention relates to supercharging of internal combustion engines and more particularly to the type of supercharging which is intermittent, that is, utilized only during periods of peak power demand of the internal combustion engine.

Supercharging of internal combustion engines is well known in the automotive field, as are various applications of intermittent engine supercharging. In the operation of a motor vehicle there are many instances when the power demand of the engine is at its peak, or where short bursts of power are necessary, such as rapid acceleration, passing, hill climbing, and the like. The general method of supercharging comprises a means of conveying compressed air to the intake manifold of the engine, the passage of the compressed air being controlled in some manner by the vehicle operator or some other suitable means. In the past, intermittent supercharging has required the use of cumbersome and complicated structures, quite expensive to manufacture and use in a motor vehicle. The compressed air is conveyed directly to the engine intake manifold, the intricate valving assemblies being relied on to provide intermittent supercharging. Thus, the compressor is required to operate at all times and the period of supercharging available at any particular time is quite short. The engine compartment of the normal automobile is relatively restricted in regard to space, and with today's design trends, the available space is becoming less and less. This makes the generally available supercharging structure unadaptable to the modern automobile because of its size and complication Intermittent supercharging has been used in the past with relatively large internal combustion engines and it has never become feasible to produce the necessary complicated structures for general use.

The device in which this invention is embodied comprises an air compressor assembly, a compressed air accumulator and an improved ejector assembly which feeds the compressed air to the engine. The construction is relatively simple and uncomplicated, thus allowing the device to be mounted in the normal restricted automobile engine compartment. The device may utilize certain parts of the conventional automobile, such as the air suspension air compressor or the like, and is most advantageous when used in an engine of relatively small size. A smaller engine is adequate for normal motor vehicle operation and, when supercharged, provides the necessary power output needed at various times. By utilizing this device the quantity of compressed air stored in the accumulator will last much longer in the over-all vehicle operation, that is, the supercharging period can be increased over that available if the air were piped directly to the engine intake system. This is particularly advantageous when using a small engine, since vehicle economy can be obtained for normal operation and the supercharging is available during periods of peak power demand.

These and other advantages will become more apparent from the following description and drawing in which the drawing illustrates diagrammatically a supercharging

2 system operatively connected to an internal combustion engine.

Referring more particularly to the drawing, an internal combustion engine 10 is illustrated. It is not necessary that the engine 10 be the typical automobile engine but could as well be a commercial vehicle such as a truck, bus, or off-road equipment. A conventional transmission and clutch assembly 12 may be mounted on the engine to drive the vehicle, and the usual crank shaft 14 extends through the engine and is driven thereby. The crank shaft has a pulley 16 mounted thereon, conventionally used to drive the cooling fan 18 through the fan pulley 20. A cooling water outlet 22 is provided to return engine cooling water to the radiator to be cooled by the fan 18. A conventional carburetor 23 may be mounted on the engine, as in the normal vehicle. The carburetor 23 communicates with the engine intake manifold to convey the air and gas mixture to the engine cylinders for combustion.

An air compressor 24 is mounted in the vehicle engine compartment in a suitable manner such that the compressor may be driven by the fan belt 26 through the pulley 28. The compressor could be of the piston pump type, having two or more stages, to compress air from atmospheric pressure to some predetermined level, as between 1,000 and 3,000 p.s.i.a. If a final pressure above this range is desired, further stages may be added to the compressor.

The compression processes should approach isothermal conditions, such conditions being the most desirable as requiring the least amount of work. The type of compressor presently being installed in motor vehicles for air suspension or the like could be utilized for the first stage of compression required in the over-all unt. The compressor may also be a single unit, as shown for illustration purposes in the drawing.

The compressor is illustrated as being driven by the crank shaft 14 through the pulley 16, the belt 26 and the pulley 28. However, the compressor could just as well be driven by another source, as a separate small internal combustion engine, an electric motor powered from the battery, or could as well be driven from any part of the drive line, such as the transmission power take-off gear. In other words, any suitable method of driving the compressor is sufficient.

An air cleaner 30 is mounted on the air compressor which is generally a standard unit on most commercial compressors. The air compressor 24 may further be provided with an unloading device, either of the valve type or the clutch type, to disconnect the compressor when its use is unnecessary.

An accumulator 32 is located in a convenient space, either in the engine compartment or elsewhere in the vehicle, and is shown in the drawing as being a cylindrical tank. The accumulator may be any convenient shape such as a cylinder, sphere, length of tube, or the like, and may be of any suitable material sufficient to contain compressed air of the pressures desired. The accumulator should not be insulated since insulation would prevent heat transfer to and from the atmosphere. During the filling cycle of the accumulator, from the air compressor 24, it is desired to keep the air cool, and during the expansion of the compressed air it is desired to keep the air warm. Heat transfer is thus necessary in order to maintain the proper balance in the system.

A conduit 34 communicates between the air compressor 24 and the lower end of the accumulator 32 to convey air from the air compressor for storage in the accumulator. An outlet conduit 34 communicates with a pressure regulator 36, the pressure regulator maintaining a predetermined pressure at the accumulator outlet. A valve 38 located in the outlet conduit 34 is adaptable to control the outlet of air from the accumulator, the valve 38 being operated by a suitable linkage 40, which may be connected to the accelerator pedal linkage or to the carburetor throttle control linkage. The valve 38 is actuated by the motor vehicle operator for supercharging at the operator's desire. A conduit 42 extends from the pressure regulator 38 to the ejector assembly, illustrated generally by the numeral 44.

The ejector assembly 44 has a bell-mouthed inlet 46 into which the conduit 42 extends with sufficient clearance for the inlet of secondary or atmospheric air through a conventional air cleaner and silencer 48. The secondary or atmospheric air is allowed to pass, even though compressed air is not being supplied through the conduit 42, for normal aspiration of the engine 10 during unsupercharged operation of the engine.

A mixing chamber 50 provides for mixing the compressed air from the conduit 42 and the atmospheric air entering through the cleaner and silencer 48, for properly mixing the atmospheric air and the compressed air. A frustroconical diffusor chamber 52, with the small end thereof adjoining the mixing chamber 50, provides means for decreasing the velocity of the air passing into the section and increasing the pressure therein to the proper supercharging pressure. The turbulence of the air mixture, imparted by the velocity of the compressed air and the mixing chamber 50, is substantially smoothed out in the diffusor section 52.

An inlet pipe 54, communicating directly with the air intake of the carburetor 23, is secured to the larger end of the diffusor section and conveys the mixed compressed and atmospheric air to the carburetor and then to the engine cylinders.

In the operation of the motor vehicle, the air compressor 24 is allowed to build up a certain amount of compressed air at a predetermined pressure in the accumulator 32. The valve member 38 is normally closed and normal aspiration of the engine is accomplished by secondary air at atmospheric pressure entering the inlet manifold through the cleaner and silencer 48 and through the carburetor 23. When the motor vehicle operator requires greater power than normal aspiration can give, he actuates the outlet valve 38 through the linkage 40 to permit compressed air to pass through the conduit 42 and mix with the atmospheric air in the mixing chamber 50. The mixture will then be conveyed to the intake manifold and cylinders of the engine at increased pressure to supercharge the engine and provide added power.

In the operation of the ejector, the primary air from the conduit 42 varies in pressure from 100 to 200 p.s.i. This primary air draws in a quantity of secondary air through the air cleaner and silencer assembly 48, the amount of the secondary air being approximately twice the volume of the primary air. The two supplies of air are mixed in the chamber 50 and delivered to the carburetor 23 at approximately 4 to 8 inches of mercury above atmospheric pressure to provide supercharging.

The above described method of accumulator supercharging is an uncomplicated system, providing added power to an internal combustion engine during periods of power demand when normal operation or aspiration of the engine is not sufficient.

I claim:

1. Supercharging means for an internal combustion engine having a crankshaft and a carburetor comprising an air compressor, means connected to said crankshaft for driving said air compressor, air storage means in communication with said air compressor, air ejector means communicating with said carburetor and upstream thereof for admitting air to said engine, primary air conduit means connected to said air storage means and communicating with said ejector means for conveying compressed air from said storage means to said engine, secondary air inlet means communicating with said ejector to convey atmospheric air to said engine, and valve means in said primary air conduit means to permit passage of compressed air therethrough to mix with the air admitted through said secondary air inlet means to supercharge said engine during periods of peak power demand, said secondary air inlet means admitting air at atmospheric pressure to said engine during normal operation thereof.

2. In a motor vehicle having an engine compartment, means for supercharging an engine mounted in said compartment during periods of peak power demand and comprising an air compressor mounted in said compartment and driven by said engine, an accumulator for temporary storage of air compressed by said air compressor, conduit means connecting said air compressor and said accumulator, ejector means in said engine compartment and communicating with a carburetor mounted on said engine and upstream thereof, conduit means between said accumulator and said ejector means for conveying compressed air thereto, atmospheric air inlet means communicating with said ejector means for admitting atmospheric air to said engine during normal operation thereof, and valve means in said conduit between said accumulator and said ejector means to allow passage of compressed air therethrough and to said ejector means to be mixed with air admitted through said atmospheric air inlet means during periods of peak power demand and to supercharge said engine.

3. Air ejector means communicating with an internal combustion engine through a carburetor mounted on said engine and upstream thereof for supercharging said engine during periods of peak power demand and comprising an inlet portion to receive compressed air from an accumulator and secondary air from the atmosphere, a mixing chamber for mixing said compressed air and said atmospheric air, a frustro-conical diffuser section having the smaller end thereof in communication with said mixing chamber, and an inlet conduit connected to said diffusor section at the larger end thereof to convey the air mixture passing therethrough to said engine.

4. In a motor vehicle having an internal combustion engine, the combustion of air compressor means, air accumulator means connected thereto, and air ejector means in communication with said accumulator means for supercharging said internal combustion engine during periods of peak power demand; said accumulator means including a compressed air storage member, a first conduit connecting said storage member with said air compressor, a second conduit connecting said storage member with said ejector, and valve means in said second conduit and intermittently operable to allow compressed air to pass therethrough during periods of peak power demand and to prevent air from passing therethrough during normal operation of said engine; said ejector means including an inlet for receiving compressed air from said storage member through said second conduit and to receive air at atmospheric pressure for normal operation of said engine, a mixing chamber communicating with said inlet to mix said compressed air and said atmospheric air when said compressed air is conveyed thereto through said valve means, a frustro-conical diffusor communicating at the smaller end thereof with said mixing chamber for decreasing the velocity and increasing the pressure of the air mixture flowing therethrough, and an inlet conduit connecting the larger end of said diffusor with the intake port of a carburetor secured to said engine to supercharge said engine during periods of peak power demand.

References Cited in the file of this patent

UNITED STATES PATENTS

| | | |
|---|---|---|
| 1,746,309 | Herier | Feb. 11, 1930 |
| 1,765,278 | Lavergne | June 17, 1930 |

FOREIGN PATENTS

| | | |
|---|---|---|
| 97,371 | Austria | June 25, 1924 |
| 710,105 | France | Jan. 28, 1931 |
| 833,877 | Germany | Mar. 13, 1949 |